United States Patent Office 3,017,422
Patented Jan. 16, 1962

3,017,422
COMPOSITION OF MATTER
Ralph B. Thompson, Hinsdale, Ill., assignor, by mesne assignments, to Universal Oil Products Company, Des Plaines, Ill., a corporation of Delaware
No Drawing. Filed Jan. 8, 1958, Ser. No. 707,693
9 Claims. (Cl. 260—461)

This invention relates to a novel composition of matter, and to the manufacture and use thereof.

The novel composition of matter of the present invention may be illustrated by the following general structure:

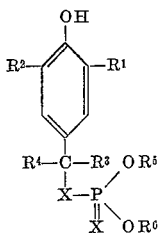

where $R^1$, $R^2$, $R^3$, $R^4$, $R^5$ and $R^6$ are selected from the group consisting of hydrogen and alkyl groups, and X is selected from the group consisting of oxygen and sulfur.

The novel composition of matter is prepared by the reaction of a quinone methide with a phosphoric acid or dithiophosphoric acid, and may be illustrated by the following general equation:

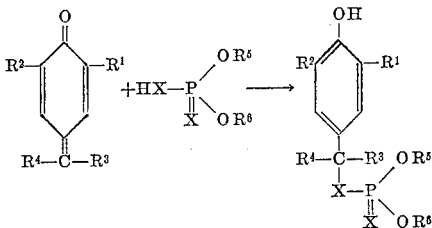

in which the symbols $R^1$ through $R^6$ have the same significance as indicated above.

Any suitable quinone methide may be used in preparing the novel composition of matter. While these compounds may be named as quinone methides, they also may be named as 4-alkylidene-2,5-cyclohexadiene-1-one. Thus, for example, a compound in which $R^1$ and $R^2$ are tertiary butyl groups and $R^3$ and $R^4$ are methyl groups may be named 2,6-di-tert-butyl-4-isopropylidene quinone methide. This compound also may be named 2,6-di-tert-butyl-4-isopropylidene-2,5-cyclohexadiene-1-one. The latter terminology appears preferred and, accordingly, will be used in the present specification and claims.

The preferred quinone methide for use as a reactant in the present invention comprises one in which $R^1$ and $R^2$ are tertiary alkyl groups and $R^3$ and $R^4$ are alkyl groups. Where $R^3$ and $R^4$ are methyl groups, preferred quinone methides include 2,6-di-tert-butyl-4-isopropylidene-2,5-cyclohexadiene-1-one, 2,6 - di - tert - amyl-4-isopropylidene-2,5-cyclohexadiene-1-one, 2,6-di-tert-hexyl-4-isopropylidene-2,5-cyclohexadiene-1-one, 2,6-di-tert-heptyl-4-isopropylidene-2,5-cyclohexadiene-1-one, 2,6-di-tert-octyl-4-isopropylidene-2,5-cyclohexadiene-1-one, etc. In general it is preferred that both tertiary alkyl groups are the same although, in some cases, they may be different as, for example, in compounds including 2-tert-butyl-6-tert-amyl-4-isopropylidene-2,5-cyclohexadiene-1-one, etc., 2-tert-amyl-6-tert-hexyl-4-isopropylidene - 2,5 - cyclohexadiene-1-one, etc. As hereinbefore set forth, it is preferred that $R^1$ and $R^2$ are tertiary alkyl groups. However, in some cases, these may be secondary or primary alkyl groups and will include compounds as 2,6-diisopropyl-4-isopropylidene-2,5-cyclohexadiene-1-one, 2,6-di-sec-butyl-4-isopropylidene-2,5-cyclohexadiene-1-one, 2,6-dimethyl-4-isopropylidene-2,5-cyclohexadiene-1-one, 2,6-diethyl-4-isopropylidene-2,5-cyclohexadiene-1-one, 2-methyl-6-tert-butyl-4-isopropylidene-2,5-cyclohexadiene-1-one, 2-methyl-6-sec-butyl-4-isopropylidene-2,5-cyclohexadiene-1 - one, 2-methyl-6-n-butyl-4-isopropylidene-2,5-cyclohexadiene-1-one, 2-methyl-6-isopropyl-4-isopropylidene-2,5-cyclohexadiene-1-one, etc.

While quinone methides having an isopropylidene group in the 4-position are preferred, it is understood that compounds having other alkylidene groups may be employed including, for example, such groups as methylidene, ethylidene, 1-propylidene, butylidene, pentylidene, hexylidene, heptylidene, octylidene, etc. It is understood that the various quinone methides which may be used as a reactant are not necessarily equivalent and also that two or more quinone methides may be employed.

Any suitable phosphoric acid or thiophosphoric acid and preferably alkyl substituted acids may be employed in preparing the novel composition of matter of the present invention. When the composition of matter is used as an additive for rubber, alkyl and preferably dialkyl dithiophosphoric acids are employed. Dialkyl dithiophosphoric acids include diisopropyl dithiophosphoric acid, dibutyl dithiophosphoric acid, diamyl dithiophosphoric acid, dihexyl dithiophosphoric acid, diheptyl dithiophosphoric acid, dioctyl dithiophosphoric acid, dinonyl dithiophosphoric acid, didecyl dithiophosphoric acid, diundecyl dithiophosphoric acid, didodecyl dithiophosphoric acid, ditridecyl dithiophosphoric acid, dietetradecyl dithiophosphoric acid, dipentadecyl dithiophosphoric acid, dihexadecyl dithiophosphoric acid, diheptadecyl dithiophosphoric acid, dioctadecyl dithiophosphoric acid, dinonadecyl dithiophosphoric acid, dieicosyl dithiophosphoric acid, etc. Conveniently, these alkyl groups are introduced through the use of fatty alcohols and thus the alkyl groups may be selected from capryl, lauryl, myristyl, palmityl, stearyl, cetyl, etc. It is understood that the alkyl groups may be straight or branched chain, that the alkyl groups may be primary, secondary or tertiary substituents, and that $R^5$ and $R^6$ may comprise the same or different alkyl groups. Monoalkyl dithiophosphoric acids, when employed, preferably comprise those in which the alkyl group is selected from those hereinbefore set forth.

In another embodiment of the invention alkyl or dialkyl phosphoric acids are utilized in preparing the novel composition of matter of the present invention. Illustrative alkyl phosphoric acids include isopropyl phosphoric acid, diisopropyl phosphoric acid, butyl phosphoric acid, dibutyl phosphoric acid, pentyl phosphoric acid, dipentyl phosphoric acid, hexyl phosphoric acid, dihexyl phosphoric acid, heptyl phosphoric acid, diheptyl phosphoric acid, octyl phosphoric acid, dioctyl phosphoric acid, nonyl phosphoric acid, dinonyl phosphoric acid, decyl phosphoric acid, didecyl phosphoric acid, undecyl phosphoric acid, diundecyl phosphoric acid, dodecyl phosphoric acid, didodecyl phosphoric acid, tridecyl phosphoric acid, ditridecyl phosphoric acid, pentadecyl phosphoric acid, dipentadecyl phosphoric acid, hexadecyl phosphoric acid, dihexadecyl phosphoric acid, heptadecyl phosphoric acid, diheptadecyl phosphoric acid, octadecyl phosphoric acid, dioctadecyl phosphoric acid, nonadecyl phosphoric acid, dinonadecyl phosphoric acid, eicosyl phosphoric acid, dieicosyl phosphoric acid, etc. Here again, it is understood that, in the dialkyl phosphoric acids, the alkyl groups may be the same or different.

When desired a mixture of the mono- and/or dialkyl phosphoric acids and/or mono- and/or dialkyl dithiophosphoric acid may be employed. In some cases these are recovered as a mixture and may be used in the present invention without the added cost of separating the individual compounds. For example, a mixture of mono- and dioctyl phosphoric acids is available commercially, generally at a lower cost than the individual compounds, and may be used in the present invention. It is understood that the various phosphates which may be used in preparing the novel composition of matter of the present invention are not necessarily equivalent but generally will be selected with reference to the end use of the final composition of matter.

Referring to the general structure hereinbefore set forth, it will be noted that the final product contains an aromatic ring. The substituted quinone aromatizes readily and thus the final product will contain the aromatic configuration. Accordingly, the reaction of the present invention may be considered as an addition-rearrangement type.

The reaction of the quinone methide and phosphoric or thiophosphoric acid is effected in any suitable manner. The reaction is exothermic and preferably is controlled by effecting the same in the presence of an inert solvent. Any suitable solvent may be employed, an aromatic hydrocarbon being particularly preferred. The aromatic hydrocarbons include benzene, toluene, xylene, ethylbenzene, cumene, etc. Other solvents include saturated aliphatic esters, as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The specific temperature of reaction will depend upon whether a solvent is employed and, when used, upon the particular solvent. In general, the temperature may range from about $-20°$ C. to about $100°$ C. and in some cases up to $150°$ C., although temperatures outside of this range may be employed, depending upon the specific reactants and solvents utilized.

The reaction normally may be effected in the absence of a catalyst. In some cases, it is preferred to use a catalyst, and any suitable catalyst may be employed. Illustrative catalysts include anhydrous hydrogen chloride, p-toluene sulfonic acid, piperidine, etc.

From the equation hereinbefore set forth, it will be noted that one mole equivalent of quinone methide reacts with one mole equivalent of phosphoric acid or thiophosphoric acid. As hereinbefore set forth, a mixture of quinone methide or a mixture of phosphoric acids may be employed. The product will contain a mixture of compounds. However, for most cases, the mixed product is satisfactory for use as an additive to organic compounds and thus may be so employed without incurring the additional expense of separating individual compounds.

The novel compositions of matter of the present invention are quinone methide phosphates and quinone methide dithiophosphates. Thus the reaction may be described as the addition of one mole of a phosphoric acid, preferably a dialkyl phosphoric acid, or one mole of a dithiophosphoric acid, preferably a dialkyl dithiophosphoric acid, to one mole of a 4-alkylidene-2,5-cyclohexadiene-1-one. A specific illustration is the addition of diisopropyl dithiophosphoric acid to 2,6-di-tert-butyl-4-isopropylidene-2,5-cyclohexadiene-1-one to prepare S-3,5-di-tert-butyl-4-hydroxy-alpha, alpha-dimethylbenzyl-O,O-diisopropyl dithiophosphate. Other specific preferred compounds include S-3,5-di-tert-pentyl-4-hydroxy-alpha, alpha-dimethylbenzyl-O,O-diisopropyl dithiophosphate, S-3,5-di-tert-hexyl-4-hydroxy-alpha, alpha-O,O-diisopropyl dithiophosphate, S-3,5-di-tert-heptyl-4-hydroxy-alpha, alpha-O,O-diisopropyl dithiophosphate, S-3,5-di-tert-octyl-4-hydroxy-alpha, alpha-O,O-diisopropyl dithiophosphate, etc., S-3,5-di-tert-butyl-4-hydroxy-alpha-methyl-alpha-ethylbenzyl-O,O-diisopropyl dithiophosphate, S-3,5-di-tert-butyl-4-hydroxy-alpha, alpha-diethyl-O,O-diisopropyl dithiophosphate, S-3,5-di-tert-butyl-4-hydroxy-alpha-methyl-alpha-propyl-O,O-diisopropyl dithiophosphate, S-3,5-di-tert-butyl-4-hydroxy-alpha, alpha-dipropyl-O,O-diisopropyl dithiophosphate, etc., S-3,5-di-tert-butyl-4-hydroxy-alpha, alpha-dimethylbenzyl-O,O-di-butyl dithiophosphate, S-3,5-di-tert-butyl-4-hydroxy-alpha, alpha-dimethylbenzyl-O,O-di-pentyl dithiophosphate, S-3,5-di-tert-butyl-4-hydroxy-alpha, alpha-dimethylbenzyl-O,O-di-hexyl dithiophosphate, S-3,5-di-tert-butyl-4-hydroxy-alpha, alpha-dimethylbenzyl-O,O-di-heptyl dithiophosphate, S-3,5-di-tert-butyl-4-hydroxy-alpha, alpha-dimethylbenzyl-O,O-di-octyl dithiophosphate, S-3,5-di-tert-butyl-4-hydroxy-alpha, alpha-dimethylbenzyl-O,O-di-lauryl dithiophosphate, S-3,5-di-tert-butyl-4-hydroxy-alpha, alpha-dimethylbenzyl-O,O-di-stearyl dithiophosphate, etc. It is understood that these specific compounds are listed for illustrative purposes only and are not intended to limit the scope of the present invention thereto.

The novel composition of matter of the present invention has a wide range of utility. As hereinbefore set forth, it is particularly advantageous for use as an additive to organic substances and particularly rubber and oil heavier than gasoline, and particularly lubricating oil, fuel oil, diesel oil, marine oil, transformer oil, turbine oil, cutting oil, rolling oil, slushing oil, etc. These oils may be petroleum oils or they may be synthetically prepared and thus include polyesters and particularly diesters as, for example, sebacates, azelates, pimelates, adipates, pinates, etc., polyolefins including polyethylenes, polypropylenes, polybutylenes, etc., derivatives thereof including polyethylene glycols, polypropylene glycols, etc., polyethers, esters of pentaerythritol, etc., as well as these in admixtures with petroleum oils. It is understood that the composition of matter may be used as an additive for other organic compounds which undergo deterioration in transportation or in use, or as a plasticizer, flotation agent, etc. When the composition of matter contains halogen substituents, it may be used as an insecticide, fungicide, pesticide, algicide, rodenticide, etc.

As hereinbefore set forth, the composition of matter is of especial utility for use in lubricating oil. The reaction product serves a number of important functions including oxidation inhibitor (peroxide decomposer), bearing corrosion inhibitor, ring anti-plugging additive, extreme pressure additive, etc. The composition of matter also is of particular utility in other oils heavier than gasoline, in which case the composition of matter serves to improve the oil in one or more ways including retarding and/or preventing sediment or sludge formation, dispersion of sediment when formed, retarding or preventing discoloration, oxidation inhibitor, corrosion inhibitor, etc.

The composition of matter generally is recovered as a viscous liquid or solid. It may be marketed as such or as a solution in a suitable solvent including, for example, saturated paraffinic hydrocarbons including pentane, hexane, heptane, octane, etc., aromatic hydrocarbons including benzene, toluene, xylene, cumene, etc., alcohols, ketones, etc.

The concentration of composition of matter to be used as an additive will depend upon the particular organic substrate in which it is to be used. In general, the additive will be used in a concentration of from about 0.0001% to about 15% by weight or more, and more specifically in a concentration of from about 0.01% to about 3% by weight of the substrate. The additive is incorporated in the substrate in any suitable manner and preferably the mixture is suitably agitated or otherwise mixed in order to obtain intimate admixing of the additive and the substrate.

The following examples are introduced to illustrate further the novelty and utility of the present invention but not with the intention of unduly limiting the same.

EXAMPLE I

This example illustrates the reaction of 2,6-di-tertbutyl-4-isopropylidene-2,5-cyclohexadiene-1-one with diisopropyl dithiophosphoric acid. Equal molar quantities of the quinone methide and the diisopropyl dithiophosphoric acid were dissolved in a hexane solvent and the solution was saturated with anhydrous hydrogen chloride. Upon warming on a steam bath, the yellow color of the quinone methide disappeared. The reaction mixture was poured into water, washed with dilute sodium bicarbonate and the solvents were removed by evaporating under vacuum. The product was recovered as a yellow-green liquid and is S-3,5-di-tert-butyl-4-hydroxy-alpha, alpha-dimethylbenzyl-O,O-diisopropyl dithiophosphate. The calculated analysis for sulfur and phosphorus are 13.91% and 6.74%, respectively. Actually found are 12.90% sulfur and 6.65% phosphorus.

EXAMPLE II

The composition of matter prepared according to Example I was evaluated as an antiozonant in white rubber. A sample of the rubber without this additive and a sample of the rubber containing 1% by weight of this additive each were subjected to evaluation in an ozone cabinet. The samples were elongated 20% and mounted on a board and then were exposed to an atmosphere containing 25 parts of ozone per 100 million parts of air at 100° F. The sample of rubber without additive showed cracks within 4 hours of exposure in the ozone cabinet. On the other hand, the sample of rubber containing the additive was substantially free from cracks after 24 hours of exposure in the ozone cabinet. Furthermore, this additive accelerated curing of the rubber and, therefore, the amount of accelerating agent normally added to rubber may be decreased accordingly.

EXAMPLE III

The dialkyl dithiophosphoric acid used in this example is capryl stearyl dithiophosphoric acid. An equal molar equivalent of this dialkyl dithiophosphoric acid was reacted with an equal molar equivalent of 2,6-di-tert-butyl-4-isopropylidene-2,5-cyclohexadiene-1-one in substantially the same manner as described in Example I. The product is S-3,5-di-tert-butyl-4-hydroxy-alpha, alpha-dimethylbenzyl-O-capryl, O-stearyl dithiophosphate and was recovered as a yellow-green liquid, and was evaluated as a lubricating oil additive in the manner described in Example IV.

EXAMPLE IV

This example illustrates the use of the composition of matter prepared in Example III as an additive to lubricating oil. These evaluations were conducted in a Lauson engine. A typical commercial paraffinic solvent extracted lubricating oil was used. The engine was run with a jacket temperature of 350° F. and an oil temperature of 180° F. A sample of the lubricating oil without additive was used as a control sample. 0.5% by weight of S-3,5-di-tert-butyl-4-hydroxy-alpha, alpha-dimethylbenzyl-O-capryl, O-stearyl dithiophosphate prepared as described in Example III, was incorporated in another sample of the same lubricating oil. Pertinent data of these runs are reported in the following table:

Table I

| | No Additive | Additive of Example III |
|---|---|---|
| Length of test, hours | 24 | 100 |
| Oil ring plugging, percent | 60 | 10 |
| Bearing weight loss, grams | 1.6094 | 0.017 |
| Oil consumption, ml./hr | 28.50 | 15.2 |
| Neutralization number of used oil | 1.07 | 0.17 |

The run with the control sample of oil was discontinued after 24 hours because the engine stuck and further operation was impossible. On the other hand, the run using the sample of oil containing the additive continued for 100 hours as indicated in the above table. It will be noted that the bearing weight loss was considerably reduced through the use of the additive, as was also the oil consumption. Furthermore, it will be noted that the oil containing the additive had a considerably lower neutralization number than the oil without additive, thus illustrating the antioxidant or peroxide decomposing properties of the additive.

EXAMPLE V

Equal molar quantities of 2,6-di-tert-butyl-4-methylidene-2,5-cyclohexadiene-1-one and a mixed mono- and dioctyl orthophosphoric acid were dissolved in a hexane solvent and the solution was saturated with anhydrous hydrogen chloride. Following the initial reaction, the reaction mixture was heated for 4 hours on a steam bath to complete the reaction, after which the solvent was removed by distillation under vacuum. The product is a mixture of O-3,5-di-tert-butyl-4-hydroxy-alpha, alpha-dimethylbenzyl-O-octyl-phosphate and O-3,5-di-tert-butyl-4-hydroxy-alpha, alpha-dimethylbenzyl-O,O-dioctyl-phosphate. The individual phosphates may be recovered from the mixture if desired. However, as hereinbefore set forth, the mixture may be used as such and this expensive and complicated separation may be avoided.

I claim as my invention:

1. O - 3,5 - di - tert - butyl - 4 - hydroxy - alpha, alpha-dimethylbenzyl-O,O-dioctyl phosphate.

2. O - 3,5 - di - tert - butyl - 4 - hydroxy - alpha, alpha-dimethylbenzyl-O,O-diisopropyl phosphate.

3. The method of preparing a quinone methide phosphate which comprises reacting a quinone methide with a phosphoric acid at a temperature of from about —20° to about 150° C.

4. The process which comprises reacting a 2,6-dialkyl-4-isopropylidene-2,5-cyclohexadiene-1-one with a dialkyl dithiophosphoric acid at a temperature of about —20° to about 150° C.

5. The process which comprises reacting 2,6-di-tert-butyl-4-isopropylidene-2,5-cyclohexadiene-1-one with diisopropyl dithiophosphoric acid at a temperature of from about —20° C. to about 150° C.

6. The process which comprises reacting 2,6-di-tert-butyl-4-isopropylidene-2,5-cyclohexadiene-1-one with O-capryl-O-stearyl dithiophosphoric acid at a temperature of from about —20° to about 150° C.

7. A compound having the following general structure:

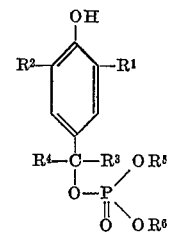

wherein $R^1$, $R^2$, $R^3$, $R^4$, $R^5$ and $R^6$ are selected from the group consisting of hydrogen and alkyl groups.

8. A compound as defined in claim 7 further characterized in that $R^3$ and $R^4$ are alkyl groups.

9. A compound as defined in claim 7 further characterized in that $R^3$ and $R^4$ are methyl groups.

References Cited in the file of this patent
UNITED STATES PATENTS

| | | |
|---|---|---|
| 2,530,339 | Mikeska et al. | Nov. 14, 1950 |
| 2,589,675 | Cook et al. | Mar. 18, 1952 |
| 2,701,259 | Schrader | Feb. 1, 1955 |
| 2,736,706 | Morris | Feb. 28, 1956 |
| 2,783,204 | McDermott | Feb. 26, 1957 |